United States Patent
Lee

(10) Patent No.: US 9,939,255 B2
(45) Date of Patent: Apr. 10, 2018

(54) APPARATUS OF MEASURING CURVATURE OF DISPLAY PANEL

(71) Applicant: Samsung Display Co., Ltd., Yongin-si, Gyeonggi-do (KR)

(72) Inventor: Jongsoo Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 23 days.

(21) Appl. No.: 15/158,519

(22) Filed: May 18, 2016

(65) Prior Publication Data

US 2017/0038193 A1    Feb. 9, 2017

(30) Foreign Application Priority Data

Aug. 3, 2015   (KR) .......................... 10-2015-0109548

(51) Int. Cl.
*G01B 11/24*    (2006.01)

(52) U.S. Cl.
CPC .................................... *G01B 11/24* (2013.01)

(58) Field of Classification Search
CPC ........... G01B 11/24; B03B 1/00; B32B 37/18; B32B 37/12; F21V 29/22; G09F 13/04
See application file for complete search history.

(56) References Cited

U.S. PATENT DOCUMENTS

| | | | | |
|---|---|---|---|---|
| 5,936,613 | A * | 8/1999 | Jaeger | G06F 3/0238 345/172 |
| 2014/0003031 | A1* | 1/2014 | Kim | F21V 29/22 362/97.1 |
| 2014/0197380 | A1* | 7/2014 | Sung | H01L 27/3241 257/40 |
| 2015/0165720 | A1* | 6/2015 | Lim | B32B 1/00 428/174 |
| 2015/0192952 | A1* | 7/2015 | Jung | G06F 1/1601 361/747 |
| 2016/0088745 | A1* | 3/2016 | Lee | G02F 1/133308 361/749 |
| 2016/0161085 | A1* | 6/2016 | Kwon | G02F 1/133608 362/97.1 |

FOREIGN PATENT DOCUMENTS

| | | |
|---|---|---|
| KR | 10-0721262 B1 | 5/2007 |
| KR | 10-1151194 B1 | 6/2012 |
| KR | 10-1397563 B1 | 5/2014 |

* cited by examiner

*Primary Examiner* — Sang Nguyen
(74) *Attorney, Agent, or Firm* — Lewis Roca Rothgerber Christie LLP

(57) ABSTRACT

A curvature measuring apparatus includes: a fixing member including: a curvature portion under the display panel, the curvature portion including a bending portion to support the display panel; and a plurality of protrusions at both ends of the curvature portion; a support adjacent to the fixing member to fix the fixing member, the support including a plurality of coupling grooves; and a measuring member above the display panel to measure a curvature of the bending portion of the display panel, wherein one of the protrusions is in one of the coupling grooves.

16 Claims, 4 Drawing Sheets

APPARATUS OF MEASURING CURVATURE OF DISPLAY PANEL

CROSS-REFERENCE TO RELATED APPLICATION

This U.S. non-provisional patent application claims priority to and the benefit of Korean Patent Application No. 10-2015-0109548, filed on Aug. 3, 2015, the contents of which are hereby incorporated by reference in its entirety.

BACKGROUND

1. Field

Embodiments of the present invention relate to an apparatus of measuring a curvature of a display panel.

2. Description of the Related Art

In recent years, mobile electronic devices are widely used. The mobile electronic devices include small and medium-sized electronic devices, such as mobile phones, tablets, personal computers, etc.

The mobile electronic devices include display devices in order to perform various functions and to provide visual information, i.e., images, to users. As components for driving the display devices become small, the proportion of the display devices with respect to the mobile electronic devices tends to increase. In particular, because various designs for the mobile electronic devices have been suggested, flexible display devices are used.

In recent years, display devices having various curvatures have been developed. The curvature of the display panel was typically measured when the display panel of a display device is fixed to only one location.

The above information disclosed in this Background section is only to enhance the understanding of the background of the disclosure, and therefore it may contain information that does not constitute prior art.

SUMMARY

Embodiments of the present invention provide an apparatus of measuring a curvature of a display panel having various curvatures.

Embodiments of the inventive concept provide a curvature measuring apparatus including: a fixing member including: a curvature portion disposed under the display panel, the curvature portion including a bending portion to support the display panel; and a plurality of protrusions disposed at both ends of the curvature portion; a support disposed adjacent to the fixing member to fix the fixing member, the support including a plurality of coupling grooves; and a measuring member disposed above the display panel to measure a curvature of the bending portion of the display panel, wherein one of the protrusions is in one of the coupling grooves.

The bending portion may include first and second bending portions, each having a curvature, the first and second bending portions being respectively disposed in areas of the display panel, which are respectively adjacent to sides of the display panel, and the curvature portion includes a first curvature portion disposed between an upper surface of the curvature portion and one side surface of the curvature portion in a first direction and a second curvature portion disposed between the upper surface of the curvature portion and another side surface of the curvature portion in the first direction. The first and second curvature portions may have a curvature.

The first and second bending portions may have the same curvature as that of the first and second curvature portions.

An area of the display panel between the first and second bending portions may be configured to make contact with the upper surface of the curvature portion, the first bending portion may be configured to make contact with an upper surface of the first curvature portion, the second bending portion may be configured to make contact with an upper surface of the second curvature portion, the area of the display panel between the first bending portion and one side of the display panel in the first direction may be configured to make contact with one side surface of the curvature portion in the first direction, and an area of the display panel between the second bending portion and the other side of the display panel in the first direction may be configured to make contact with the other side surface of the curvature portion in the first direction.

The protrusions may include a first protrusion disposed at one end of the curvature portion in the first direction and a second protrusion disposed at another end of the curvature portion in the first direction.

The first protrusion may include a first insertion portion connected to the one end of the curvature portion and protruding in the first direction, a second insertion portion connected to an edge of the first insertion portion in the first direction and protruding upward from the edge of the first insertion portion, and a groove recessed downward from an upper surface of one side of the first insertion portion connected to the one end of the curvature portion in the first direction.

A lower surface of the curvature portion and a lower portion of the first insertion portion may be placed on the same plane surface, a height of the upper surface of the curvature may be greater than a height of an upper surface of the first insertion portion, and a height of an upper surface of the second insertion portion may be greater than a height of the upper surface of the first insertion portion.

A portion of the display panel adjacent to one side of the display panel may be in the groove to allow the display panel to be fixed to the groove.

The support may include a body portion disposed under the fixing member and a side surface portion disposed at one end of the body portion in the first direction, and the coupling grooves may include a first coupling groove disposed at the side surface portion and a second coupling groove recessed downward from an area of an upper surface of the body portion of adjacent to the other side of the body portion, and facing one end of the body portion in the first direction.

The side surface portion may include a first side surface portion connected to the one end of the body portion in the first direction and extending upward from the one end of the body portion, a second side surface portion connected to an upper end of the first side surface portion to be substantially parallel to the body portion and extending towards an inside of the body portion, and a third side surface portion connected to an edge of the second side surface portion in the first direction and extending downward from the edge of the second side surface.

The third side surface portion may be disposed to be spaced apart from the body portion by a distance and a lower surface of the third side surface may be disposed lower than a lower surface of the second side surface portion.

The first coupling groove may include a first insertion groove defined by a space between the third side surface portion and the body portion and a second insertion groove defined by a space between the first side surface portion and the third side surface portion and a space between the second side surface portion and the body portion.

The first insertion portion may be in the first insertion groove and the second insertion portion is in the second insertion groove.

The second coupling groove may include a third insertion groove recessed downward from the upper surface of the body portion and a fourth insertion groove extending in the first direction from a lower portion of the third insertion groove.

The second insertion portion may be in the fourth insertion groove and the first insertion portion is in the third insertion groove.

The measuring member may measure a length of the display panel and a curvature of the first and second bending portions of the display panel while moving on the display panel along the first direction.

The measuring member may measure a distance between the display panel, and the measuring member may measure the curvature of the first and second bending portions of the display panel using the distance between the display panel and the measuring member while moving on the display panel along the first direction.

According to the above, the fixing member, which makes contact with the display panel and supports the display panel, is connected to the support including the coupling grooves and coupled to the fixing member and measures the curvature of the bending portion of the display panel disposed on the support. Thus, the curvature of the display panel may be precisely measured at various locations.

BRIEF DESCRIPTION OF THE DRAWINGS

The above and other aspects of embodiments of the present invention will become readily apparent by reference to the following detailed description when considered in conjunction with the accompanying drawings wherein.

DETAILED DESCRIPTION

Figure 1:
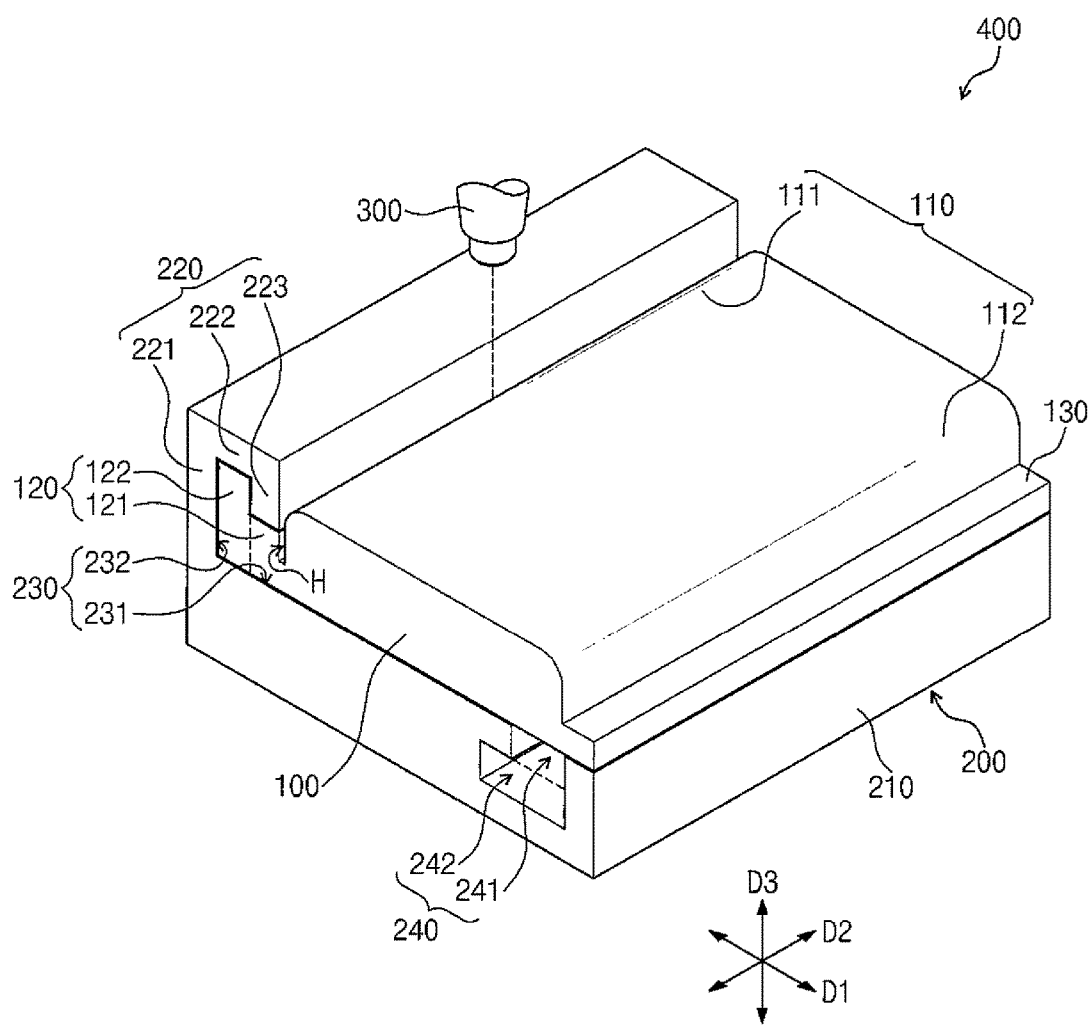
FIG. 1 is a perspective view showing an apparatus for measuring a curvature of a display panel according to an exemplary embodiment of the present invention.

The following description with reference to the accompanying drawings is provided to assist in a comprehensive understanding of various embodiments of the present invention as defined by the claims and their equivalents. It includes various suitable specific details to assist in that understanding but these are to be regarded as merely exemplary. Accordingly, those of ordinary skill in the art will recognize that various changes and modifications to the various embodiments described herein can be made without departing from the scope and spirit of the present invention. In addition, descriptions of well-known functions and constructions may be omitted for clarity and conciseness. The terms and words used in the following description and claims are not limited to the bibliographical meanings, but, are merely used to enable a clear and consistent understanding of embodiments of the present invention. Accordingly, it should be apparent to those skilled in the art that the following description of various embodiments of the present invention is provided for illustration purpose only and not for the purpose of limiting the present invention as defined by the appended claims and their equivalents.

It will be understood that, although the terms first, second, etc. may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer or section discussed below could be termed a second element, component, region, layer, or section without departing from the spirit and scope of the present invention.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below", "beneath", or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

Further, it will also be understood that when one element, component, region, layer and/or section is referred to as being "between" two elements, components, regions, layers, and/or sections, it can be the only element, component, region, layer and/or section between the two elements, components, regions, layers, and/or sections, or one or more intervening elements, components, regions, layers, and/or sections may also be present.

The terminology used herein is for the purpose of describing particular embodiments and is not intended to be limiting of the present invention. As used herein, the singular forms "a" and "an" are intended to include the plural forms as well, unless the context clearly indicates otherwise. It will be further understood that the terms "comprise," "comprises," "comprising," "includes," "including," and "include," when used in this specification, specify the presence of stated features, integers, steps, operations, elements, and/or components, but do not preclude the presence or addition of one or more other features, integers, steps, operations, elements, components, and/or groups thereof.

As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the present invention refers to "one or more embodiments of the present invention." Also, the term "exemplary" is intended to refer to an example or illustration.

It will be understood that when an element or layer is referred to as being "on," "connected to," "coupled to," "connected with," "coupled with," or "adjacent to" another element or layer, it can be "directly on," "directly connected to," "directly coupled to," "directly connected with," "directly coupled with," or "directly adjacent to" the other element or layer, or one or more intervening elements or layers may be present. Further "connection," "connected," etc. may also refer to "electrical connection," "electrically connect," etc. depending on the context in which they are used as those skilled in the art would appreciate. When an element or layer is referred to as being "directly on," "directly connected to," "directly coupled to," "directly connected with," "directly coupled with," or "immediately adjacent to" another element or layer, there are no intervening elements or layers present.

As used herein, the term "substantially," "about," and similar terms are used as terms of approximation and not as terms of degree, and are intended to account for the inherent deviations in measured or calculated values that would be recognized by those of ordinary skill in the art.

As used herein, the terms "use," "using," and "used" may be considered synonymous with the terms "utilize," "utilizing," and "utilized," respectively.

Hereinafter, embodiments of the present invention will be explained in detail with reference to the accompanying drawings.

FIG. 1 is a perspective view showing a curvature measuring apparatus 400 for measuring a curvature of a display panel according to an exemplary embodiment of the present invention.

Referring to FIG. 1, the curvature measuring apparatus 400 measures a curvature of a display panel. The curvature measuring apparatus 400 includes a fixing member 100, a support 200 disposed under the fixing member 100 to support the fixing member 100, and a measuring member 300 disposed above the fixing member 100.

The fixing member 100 includes a curvature portion 110 and a plurality of protrusions 120 and 130 disposed at both sides of the curvature portion 110 in a first direction D1. The curvature portion 110 and the protrusions 120 and 130 extend in a second direction D2 intersecting the first direction D1.

The curvature portion 110 includes a first curvature portion 111 disposed between an upper surface of the curvature portion 110 and one side surface of the curvature portion 110 in the first direction D1 and a second curvature portion 112 disposed between the upper surface of the curvature portion 110 and the other side surface of the curvature portion 110.

The first and second curvature portions 111 and 112 have a convex shape and a curvature (e.g., a predetermined curvature). The first and second curvature portions 111 and 112 may have the same or substantially the same curvature as each other. However, the embodiment of the inventive concept is not limited thereto, and the first and second curvature portions 111 and 112 may have different curvatures from each other.

The protrusions 120 and 130 include a first protrusion 120 disposed at and protruding from one side of the curvature portion 110 in the first direction D1 and a second protrusion 130 disposed at and protruding from the other side of the curvature portion 110 in the first direction D1.

The first protrusion 120 includes a first insertion portion 121 connected to the one side of the curvature portion 110 and protruding in the first direction D1, and a second insertion portion 122 connected to an edge of the first insertion portion 121 in the first direction D1 and protruding upward from the first insertion portion 121, and a groove H formed by recessing downward a portion of the first insertion portion 121 connected to the one side of the curvature portion 110 in the first direction D1.

In addition, a lower surface of the curvature portion 110 and a lower portion of the first insertion portion 121 are placed on the same or substantially the same plane surface, and a height of the upper surface of the curvature portion 110 is greater than a height of an upper surface of the first insertion portion 121.

That is, a thickness of the first curvature portion 111 in a third direction D3 intersecting the first and second directions D1 and D2 is greater than a thickness of the first insertion portion 121, and the first insertion portion 121 is connected to the one side surface of the curvature portion 110 to allow the first insertion portion 121 not to be overlapped with the first curvature portion 111.

A height of an upper surface of the second insertion portion 122 is greater than a height of the upper surface of the first insertion portion 121.

The second protrusion 130 is connected to the other side of the curvature portion 110 and protrudes in the first direction D1, and the lower surface of the curvature portion 110 and a lower surface of the second protrusion 130 are placed on the same or substantially the same plane surface.

The height of the upper surface of the curvature portion 110 is greater than a height of the upper surface of the second protrusion 130. That is, the thickness in the third direction D3 of the curvature portion 110 is greater than a thickness in the third direction D3 of the second protrusion 130, and the second protrusion 130 is connected to the other side surface of the curvature portion 110 to allow the second protrusion 130 not to be overlapped with the second curvature portion 112.

The support 200 includes a body portion 210 disposed under the fixing member 100 and a side surface portion 220 disposed at one side of the body portion 210 in the first direction D1.

The side surface portion 220 includes a first side surface portion 221 connected to extending upward from one side of the body portion 210 in the first direction D1, a second side surface portion 222 connected to an upper side of the first side surface portion 221 to be substantially parallel to the body portion 210 and extending inward relative to the body portion 210, and a third side surface portion 223 connected to and extending downward from an edge of the second side surface portion 222 in the first direction D1.

In the present exemplary embodiment, the third side surface portion 223 is disposed to be spaced apart from the body portion 210 by a distance (e.g., a predetermined distance) and a lower surface of the third side surface portion 223 is lower than a lower surface of the second side surface portion 222.

A first coupling groove 230 is defined by a space between the third side surface portion 223 and the body portion 210, a spaced between the first side surface portion 221 and the third side surface portion 223, and a space between the second side surface portion 222 and the body portion 210.

The first coupling groove 230 includes a first insertion groove 231 defined by the space between the third side surface portion 223 and the body portion 210 and a second insertion groove 232 defined by the space between the first side surface portion 221 and the third side surface portion 223 and the space between the second side surface portion 222 and the body portion 210.

The body portion 210 includes a second coupling groove 240 formed by a downward recessed area (e.g., a predetermined downward recessed area) of the upper surface of the body portion 210 disposed adjacent to the other side of the body portion 210 facing one side of the body portion 210 in the first direction D1.

The second coupling groove 240 includes a third insertion groove 241 and a fourth insertion groove 242, and the first protrusion 120 is configured to be inserted into the second coupling groove 240. This structure will be described in detail with reference to FIG. 4.

The measuring member 300 is disposed above the fixing member 100 and measures a length of the display panel and a curvature of the display panel making contact with the curvature portion 110 of the fixing member 100. The operation of measuring the length of the display panel and the curvature of the display panel disposed on the fixing member 100 by the measuring member 300 will be described in detail with reference to FIGS. 2 and 3.

The measuring member 300 measures the curvature of the display panel using a light source device generating a linear laser beam and a charge-coupled device (CCD) receiving the linear laser beam irradiated onto the object.

Figure 2:
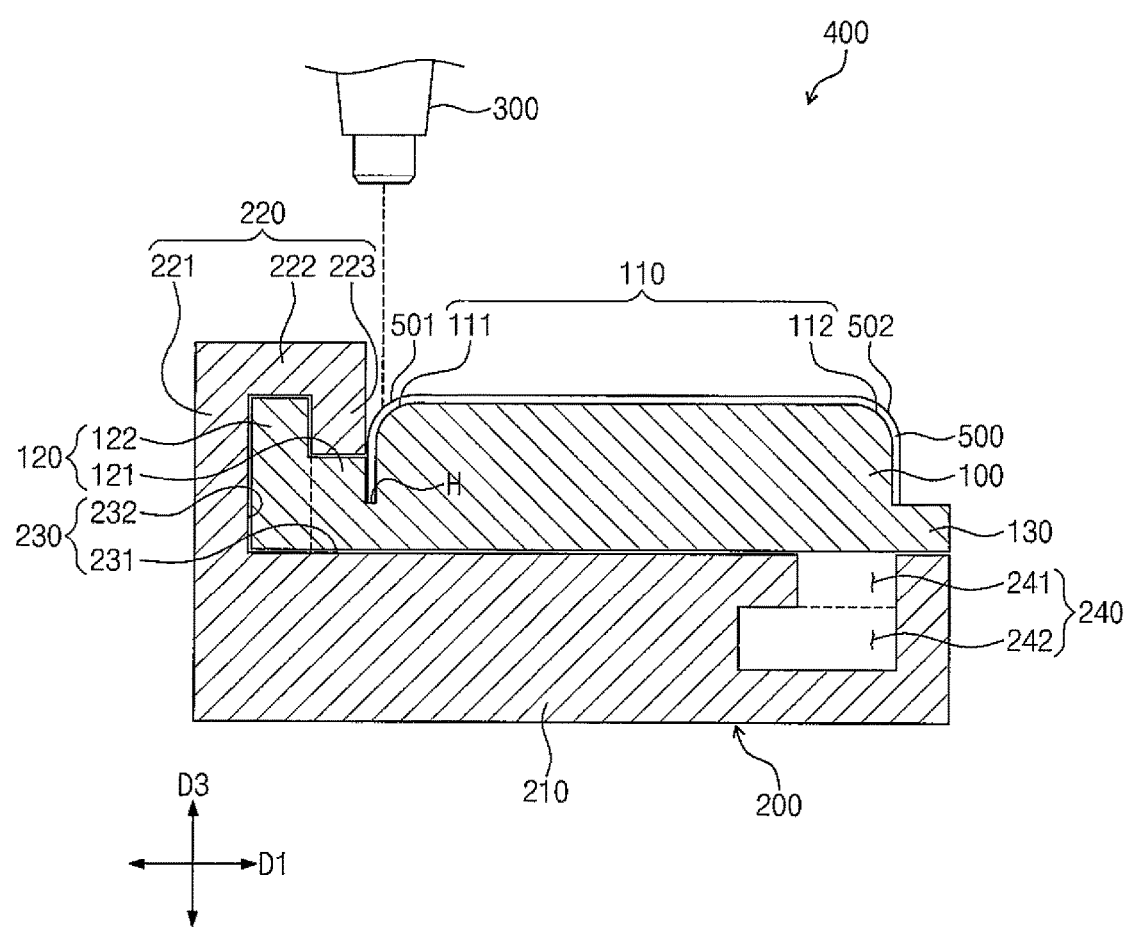
FIG. 2 is a plan view showing an apparatus for measuring a curvature of a display panel according to an exemplary embodiment of the present invention.
Figure 3:
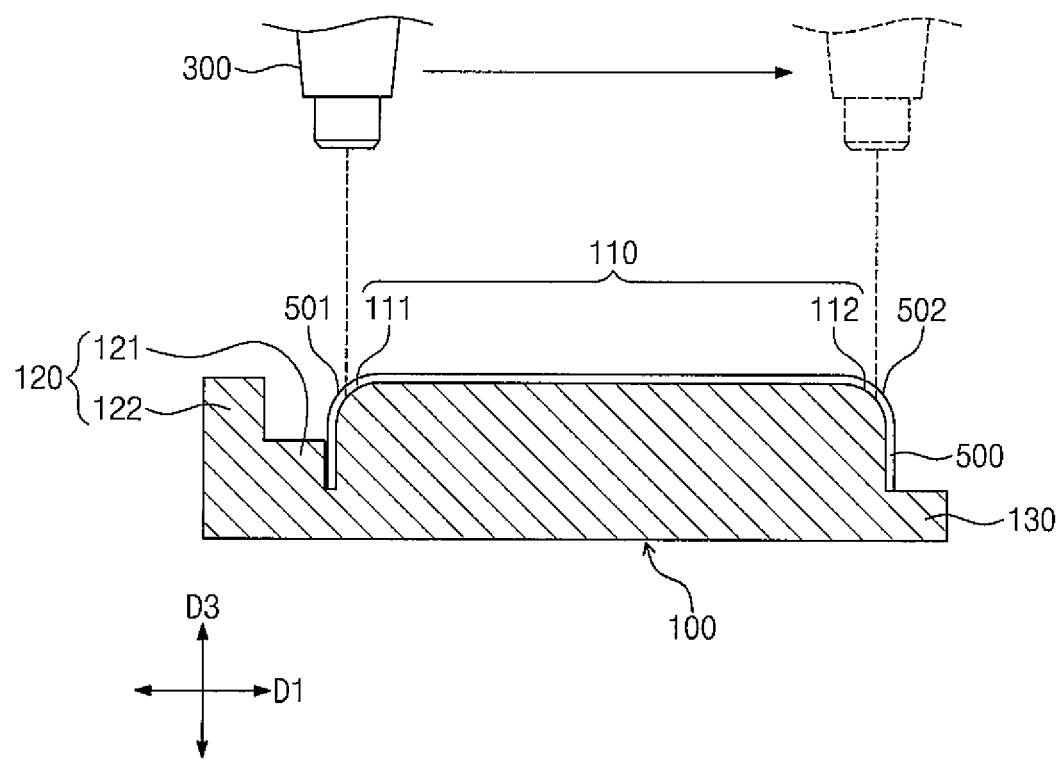
FIG. 3 is a view showing a method of measuring a bending portion of the display panel shown in FIG. 2.

FIG. 2 is a plan view showing an apparatus for measuring a curvature of a display panel 500 according to an exemplary embodiment of the present invention and FIG. 3 is a view showing a method of measuring the first and second bending portions 501 and 502 of the display panel 500 shown in FIG. 2.

In FIGS. 2 and 3, the same reference numerals denote the same elements (or components) as in FIG. 1, and thus detailed descriptions of the same elements (or components) may be omitted.

Referring to FIGS. 2 and 3, the display panel 500 may be a liquid crystal display panel including a liquid crystal layer, an organic light emitting display panel including an organic light emitting layer, an electrowetting display panel including an electrowetting layer, or an electrophoretic display panel including an electrophoretic layer.

The display panel 500 includes a substrate and a plurality of pixels disposed on the substrate to display an image. The substrate may include a glass substrate or a plastic substrate.

Areas disposed adjacent to both ends of the display panel 500 in the first direction D1 have a curvature. In detail, the display panel 500 includes a first bending portion 501 and a second bending portion 502. The first and second bending portions 501 and 502 are disposed in the areas of the display panel 500, which are respectively adjacent to both ends of the display panel 500 in the first direction D1. The first and second bending portions 501 and 502 have a curvature.

The first and second bending portions 501 and 502 are disposed on the fixing member 100. The first and second bending portions 501 and 502 may have the same or substantially the same curvature as each other. However, embodiments of the inventive concept are not limited thereto, and the first and second bending portions 501 and 502 may have different curvatures from each other. The display panel 500 has a flat plate shape in an area except for the first and second bending portions 501 and 502.

The area of the display panel 500 between the first and second bending portions 501 and 502 is disposed to be substantially perpendicular to an area of the display panel 500 between the first bending portion 501 and one end of the display panel 500. The area of the display panel 500 between the first and second bending portions 501 and 502 is disposed to be substantially perpendicular to an area the display panel 500 between the second bending portion 502 and the other end of the display panel 500.

The first and second bending portions 501 and 502 of the display panel 500 have the same or substantially the same curvature as that of the first and second curvature portions 111 and 112 of the curvature portion 110.

The display panel 500 is disposed on the curvature portion 110. In detail, the area of the display panel 500 between the first and second bending portions 501 and 502 is disposed to make contact with the upper surface of the curvature portion 110.

The first bending portion 501 is disposed to make contact with an upper surface of the first curvature portion 111 and the second bending portion 502 is disposed to make contact with an upper surface of the second curvature portion 112.

The area of the display panel 500 between the first bending portion 501 and one side of the display panel 500 in the first direction D1 is disposed to make contact with one side surface of the curvature portion 110 in the first direction D1.

The area of the display panel 500 between the second bending portion 502 and the other side of the display panel 500 in the first direction D1 is disposed to make contact with the other side surface of the curvature portion 110 in the first direction D1. An edge of each of the first and second bending portions 501 and 502 is bent to the body portion 210.

An area of the display panel 500 adjacent to the one side of the display panel 500 in the area of the display panel 500 between the first bending portion 501 and the one side of the display panel 500 is inserted into and fixed to the groove H.

The first insertion portion 121 of the first protrusion 120 is inserted into the first insertion groove 231 and the second insertion portion 122 of the first protrusion 120 is inserted into the second insertion groove 232. As a result, the first protrusion 120 is inserted into and fixed to the first coupling groove 230.

The upper surface of the first insertion portion 121 makes contact with the lower surface of the third side surface portion 223 and the upper surface of the second insertion portion 122 makes contact with the second side surface portion 222.

In addition, the first insertion groove 231 and the first insertion portion 121 have the same or substantially the same height and the second insertion groove 232 and the second insertion portion 122 have the same or substantially the same height.

The measuring member 300 may sense a position of the display panel 500 and measure the length of the display panel 500. For example, the measuring member 300 may measure the length of the display panel 500 in the first direction D1. Additionally, the measuring member 300 may measure the length of the display panel 500 in the second direction D2.

For example, the measuring member 300 may include the position sensor to sense a position of the display panel 500. The position sensor senses the position of the first location of the object that is to be measured and senses the position of the second location of the object, which is different from the first location. The controller included in the measuring member 300 calculates the difference in position between the first location and the second location to measure the length in the specific area of the object between the first location and the second location.

In the present exemplary embodiment according to the present invention, a length of the plane surface area of the display panel 500 between the first bending portion 501 and the second bending portion 502 may be measured by using the position sensor of the measuring member 300.

The measuring member 300 senses the position of one side of the plane surface area of the display panel 500 between the first and second bending portions 501 and 502 in the first direction D1 and senses the position of the other side of the plane surface area of the display panel 500 between the first and second bending portions 501 and 502 in the first direction D1. The measuring member 300 measures the length of the display panel 500 using the positions of the display panel 500.

The measuring member 300 may measure the curvature of the first and second bending portions 501 and 502 of the display panel 500 while moving on the display panel 500 along the first direction D1.

The measuring member 300 measures a distance between the display panel 500 and the measuring member 300. The measuring member 300 measures the curvature of the first and second bending portions 501 and 502 using the distance between the display panel 500 and the measuring member 300.

For example, the measuring member 300 includes the curvature measurer to measure the curvature of the display panel 500. The measuring member 300 is disposed above the object having the curved surface with the curvature and positioned at a height (e.g., a predetermined height). The measuring member 300 irradiates the light onto the surface of the object while moving relative to the object having the curved surface at the uniform height and receives the light reflected by the object. The measuring member 300 measures the distance between the object and the measuring member 300 using a timing of the light received.

Because the height, i.e., position, of the measuring member 300 is uniformly maintained while the measuring member 300 moves along the first direction D1 and the measuring member 300 measures the distance between the display panel 500 and the measuring member 300.

Because the first and second bending portions 501 and 502 of the display panel 500 has the curvature, the distance between the first and second bending portions 501 and 502 and the measuring member 300 is measured differently according to the locations of the first and second bending portions 501 and 502, at which the distance between the first and second bending portions 501 and 502 and the measuring member 300 is measured.

That is, the curvature of the first and second bending portions 501 and 502 may be measured using the differences in the measured distances.

Accordingly, the curvature measuring apparatus 400 may precisely measure the curvature of the display panel 500.

Figure 4:
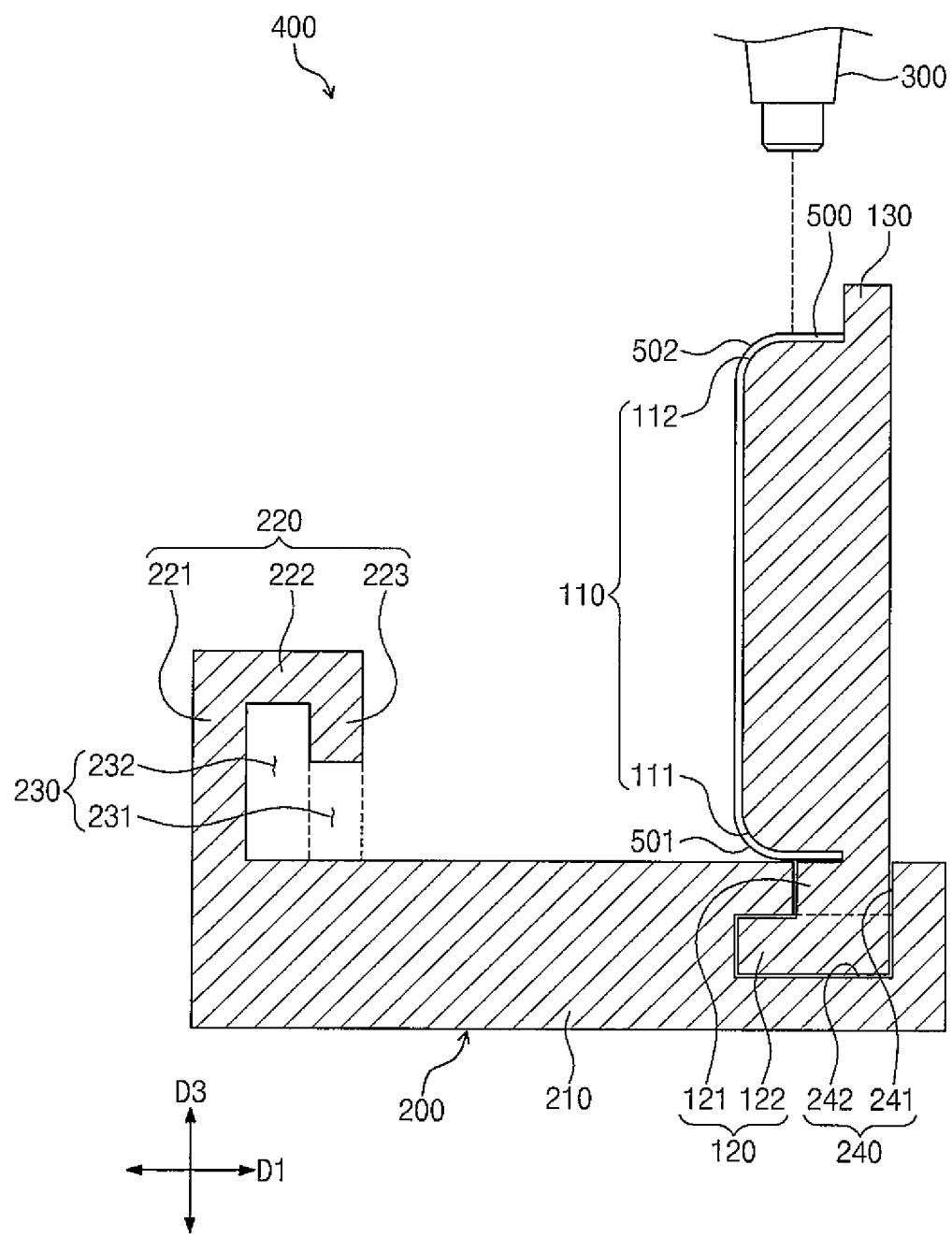
FIG. 4 is a plan view showing an apparatus for measuring a curvature of a display panel according to another exemplary embodiment of the present invention.

FIG. 4 is a plan view showing an apparatus of measuring a curvature of a display panel according to another exemplary embodiment of the present invention.

In FIG. 4, the same reference numerals denote the same elements (or components) as in FIGS. 1 to 3, and thus detailed descriptions of the same elements (or components) may be omitted.

Referring to FIG. 4, a first protrusion 120 of a fixing member 100 is inserted into a second coupling groove 240 of the support 200.

The second coupling groove 240 is formed in a body portion 210 of the support 200. The second coupling groove 240 includes a third insertion groove 241 that is recessed downward from an upper surface of the body portion 210 adjacent to the other side of the body portion 210 and a fourth insertion groove 242 extending from a lower end of the third insertion groove 241 to one side of the body portion 210 facing the other side of the body portion 210.

The fourth insertion groove 242 is disposed under the third insertion groove 241 and has a width wider than a width of the third insertion groove 241.

A first insertion portion 121 of the first protrusion 120 is inserted into the third insertion groove 241 and a second insertion portion 122 of the first protrusion 120 is inserted into and fixed to the fourth insertion groove 242.

The first insertion portion 121 and the third insertion groove 241 have substantially the same width and the second insertion portion 122 and the fourth insertion groove 242 have substantially the same width.

An edge of the second insertion portion 122 is inserted into the fourth insertion groove 242 to make contact with a lower surface of the fourth insertion groove 242 and the first insertion portion 121 is inserted into and fixed to the third insertion groove 241.

As a result, an area of the display panel 500 between first and second bending portions 501 and 502 of the display panel 500 is disposed to be substantially perpendicular to an area of the display panel 500 between the first bending portion 501 and one side of the display panel 500 and an area of the display panel 500 between the second bending portion 502 and the other side of the display panel 500.

The measuring member 300 measures the curvature of the second bending portion 502 of the display panel 500 while the measuring member 300 moves along the first direction D1.

Although exemplary embodiments of the present invention have been described, it is understood that the present invention should not be limited to these exemplary embodiments but rather various suitable changes and modifications can be made by one of ordinary skilled in the art within the spirit and scope of the present invention as defined by the following claims and their equivalents.

What is claimed is:

1. An apparatus for measuring a curvature of a display panel, comprising:
    a fixing member comprising:
        a curvature portion configured to be under the display panel, the curvature portion comprising a bending portion configured to support the display panel; and
        a plurality of protrusions at both ends of the curvature portion;
    a support adjacent the fixing member and configured to fix the fixing member, the support comprising a plurality of coupling grooves; and
    a measuring member configured to be above the display panel and configured to measure a curvature of the bending portion of the display panel,
    wherein one of the protrusions is in one of the plurality of coupling grooves,
    wherein the bending portion comprises first and second bending portions, each having a curvature, the first and second bending portions being respectively in areas of the display panel, which are respectively adjacent to sides of the display panel,
    wherein the curvature portion comprises:
        a first curvature portion between an upper surface of the curvature portion and one side surface of the curvature portion in a first direction; and
        a second curvature portion between the upper surface of the curvature portion and another side surface of the curvature portion in the first direction, and
    wherein the first and second curvature portions have a curvature.

2. The apparatus of claim 1,
    wherein the first and second bending portions have a same curvature as that of the first and second curvature portions.

3. The apparatus of claim 1,
    wherein an area of the display panel between the first and second bending portions is configured to contact the upper surface of the curvature portion, wherein the first bending portion is configured to contact an upper surface of the first curvature portion, wherein the second bending portion is configured to contact an upper surface of the second curvature portion, wherein the area of the display panel between the first bending portion and one side of the display panel in the first direction is configured to contact one side surface of the curvature portion in the first direction, and wherein an area of the display panel between the second bending portion and the other side of the display panel in the first direction is configured to contact the other side surface of the curvature portion in the first direction.

4. The apparatus of claim 1, wherein the protrusions comprise:
a first protrusion at one end of the curvature portion in the first direction; and
a second protrusion at another end of the curvature portion in the first direction.

5. The apparatus of claim 4, wherein the first protrusion comprises:
a first insertion portion connected to the one end of the curvature portion and protruding in the first direction;
a second insertion portion connected to an edge of the first insertion portion in the first direction and protruding upward from the edge of the first insertion portion; and
a groove recessed downward from an upper surface of one side of the first insertion portion connected to the one end of the curvature portion in the first direction.

6. The apparatus of claim 5,
wherein a lower surface of the curvature portion and a lower portion of the first insertion portion are at a same plane surface,
wherein a height of the upper surface of the curvature is greater than a height of an upper surface of the first insertion portion, and
wherein a height of an upper surface of the second insertion portion is greater than a height of the upper surface of the first insertion portion.

7. The apparatus of claim 5,
wherein a portion of the display panel adjacent to one side of the display panel is in the groove to allow the display panel to be fixed to the groove.

8. The apparatus of claim 5,
wherein the support comprises:
a body portion under the fixing member; and
a side surface portion at one end of the body portion in the first direction, and
wherein the coupling grooves comprise:
a first coupling groove at the side surface portion; and
a second coupling groove recessed downward from an area of an upper surface of the body portion, adjacent to the other side of the body portion, and facing one end of the body portion in the first direction.

9. The apparatus of claim 8, wherein the side surface portion comprises:
a first side surface portion connected to the one end of the body portion in the first direction and extending upward from the one end of the body portion;
a second side surface portion connected to an upper end of the first side surface portion to be substantially parallel to the body portion and extending towards an inside of the body portion; and
a third side surface portion connected to an edge of the second side surface portion in the first direction and extending downward from the edge of the second side surface.

10. The apparatus of claim 9,
wherein the third side surface portion is configured to be spaced apart from the body portion by a distance and a lower surface of the third side surface is lower than a lower surface of the second side surface portion.

11. The apparatus of claim 9, wherein the first coupling groove comprises:
a first insertion groove defined by a space between the third side surface portion and the body portion; and
a second insertion groove defined by a space between the first side surface portion and the third side surface portion and a space between the second side surface portion and the body portion.

12. The apparatus of claim 11,
wherein the first insertion portion is in the first insertion groove and the second insertion portion is in the second insertion groove.

13. The apparatus of claim 8, wherein the second coupling groove comprises:
a third insertion groove recessed downward from the upper surface of the body portion; and
a fourth insertion groove extending in the first direction from a lower portion of the third insertion groove.

14. The apparatus of claim 13,
wherein the second insertion portion is in the fourth insertion groove and the first insertion portion is in the third insertion groove.

15. The apparatus of claim 1,
wherein the measuring member is configured to measure a length of the display panel and a curvature of the first and second bending portions of the display panel while moving on the display panel along the first direction.

16. The apparatus of claim 15,
wherein the measuring member is configured to measure a distance between the display panel, and
wherein the measuring member is configured to measure the curvature of the first and second bending portions of the display panel using the distance between the display panel and the measuring member while moving on the display panel along the first direction.

* * * * *